United States Patent [19]

Figueredo et al.

[11] 4,258,763
[45] Mar. 31, 1981

[54] CUTTING DEVICE HAVING A FLEXIBLE CUTTING ELEMENT

[76] Inventors: Fernando Figueredo, 524 Ridgewood Rd., Key Biscayne, Fla. 33149; Guillermo A. Valdes, 3235 SW. 64th St., Miami, Fla. 33155; Armando R. Framil, 260 Woodcrest Rd., Key Biscayne, Fla. 33149

[21] Appl. No.: 962,289

[22] Filed: Nov. 20, 1978

[51] Int. Cl.³ .............................................. A01G 23/08
[52] U.S. Cl. .............................. 144/34 R; 30/166 R; 30/380; 56/290; 83/651.1; 83/830; 125/18
[58] Field of Search ............... 299/82, 83, 84; 56/290, 56/291, 292; 83/651.1, 830, 831, 832, 928; 145/31; 144/34 R, 3 D, 309 AC; 30/380, 381, 166, 371; 125/16 R, 18

[56] References Cited

U.S. PATENT DOCUMENTS

| | | | |
|---|---|---|---|
| 1,457,761 | 6/1923 | Wilson | 144/34 R |
| 2,749,949 | 6/1956 | DeLaTramerye | 30/166 |
| 2,752,964 | 7/1956 | Prusinski | 83/830 |
| 3,214,824 | 11/1965 | Brown | 30/381 |
| 3,786,701 | 1/1974 | Ludwig | 83/651.1 |

*Primary Examiner*—W. Donald Bray
*Attorney, Agent, or Firm*—Duckworth, Hobby, Allen & Pettis

[57] ABSTRACT

A plurality of cutting teeth are disposed at intervals in a complete circle around the periphery of a flexible cutting element. A frame is coupled to the cutting element to receive and guide the cutting element. Means is coupled to the cutting element and to the frame to impart an oscillatory motion to the cutting element to enable the oscillating teeth of the cutting element to cut a selected material. A simplified version of the present invention includes first and second handles coupled to opposite ends of the flexible cutting element to enable an operator to impart an oscillatory motion to the cutting element.

28 Claims, 19 Drawing Figures

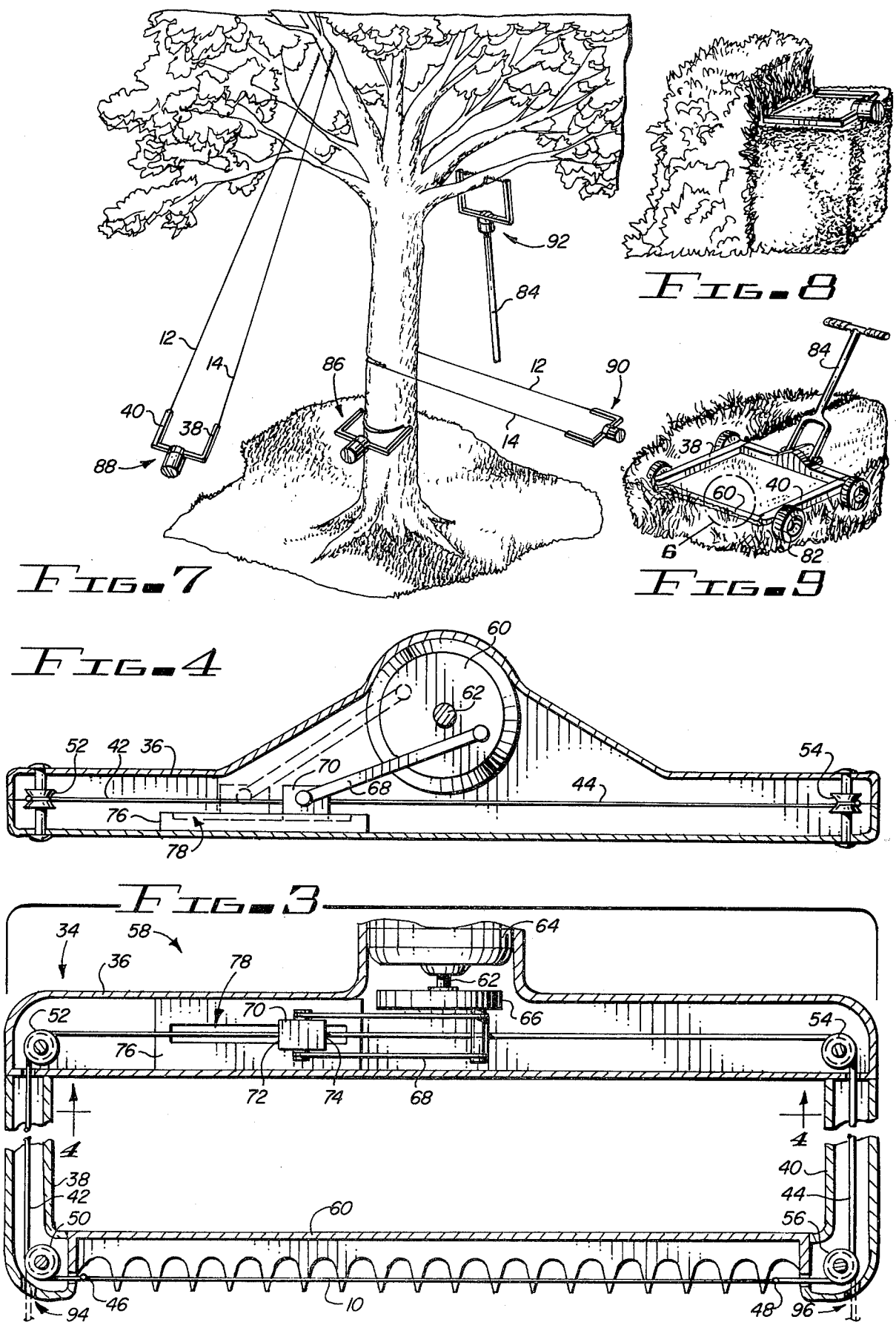

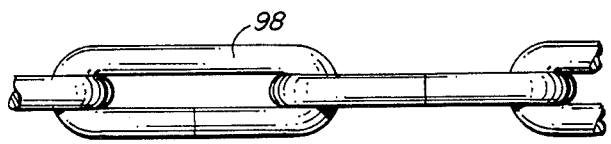
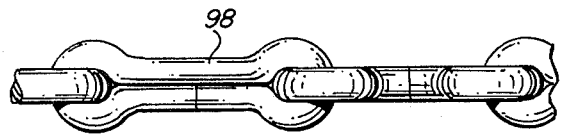
FIG.-11A    FIG.-11B
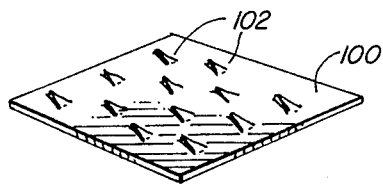
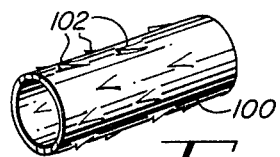
FIG.-11C    FIG.-11D
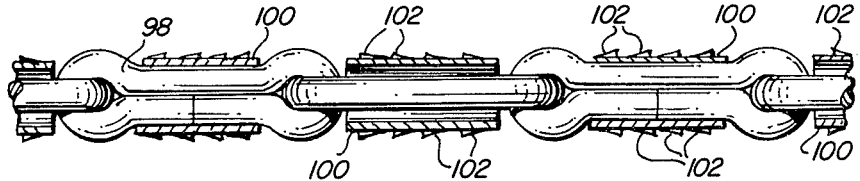
FIG.-11E
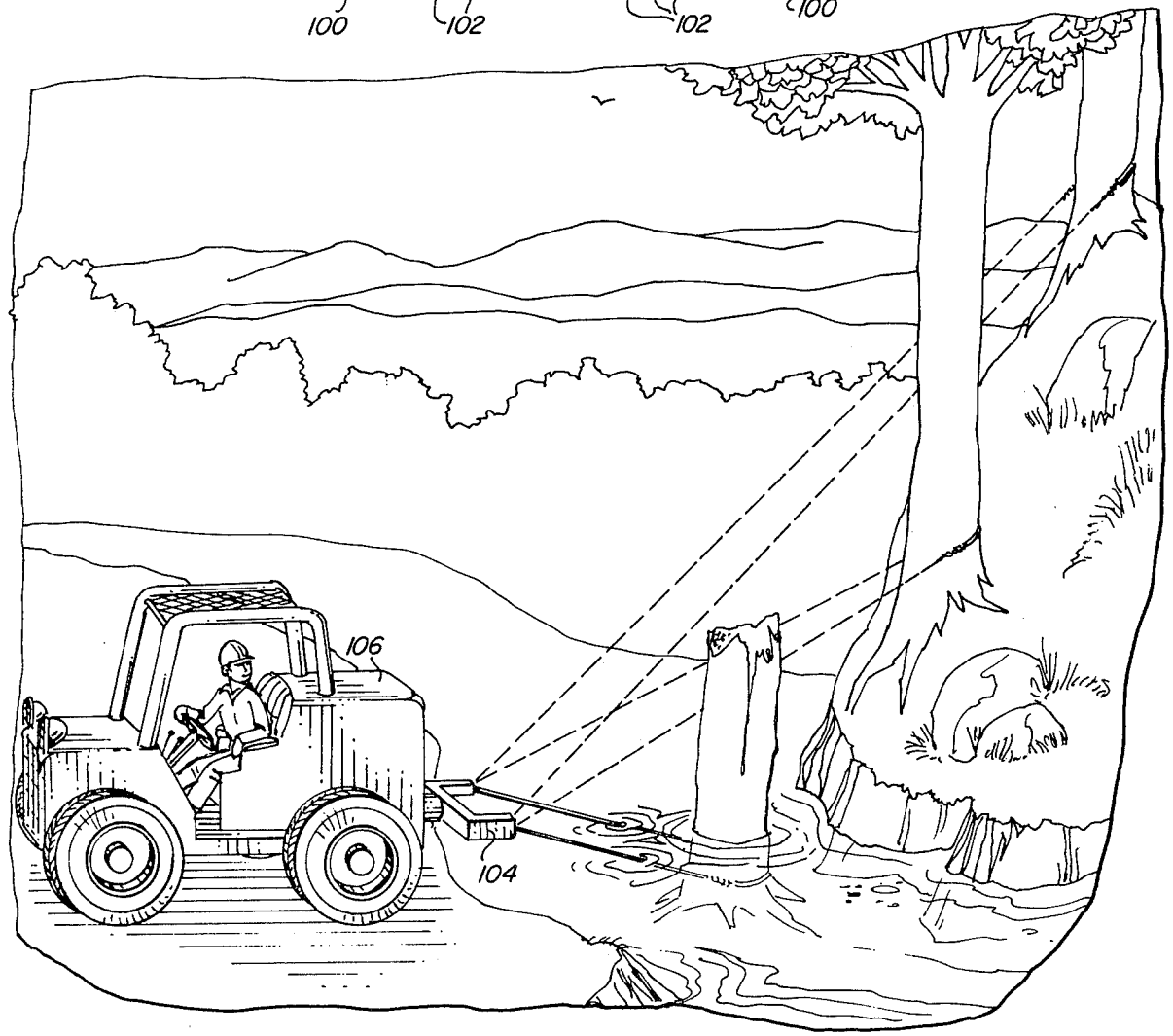
FIG.-12

CUTTING DEVICE HAVING A FLEXIBLE CUTTING ELEMENT

BACKGROUND OF THE INVENTION

1. Field of the Invention

The present invention relates to cutting devices having a flexible cutting element, and more particularly, to cutting devices having a flexible cutting element with cutting teeth disposed in a complete circle around the periphery of the cutting element.

2. Description of the Prior Art

It is frequently desirable to have a power driven cutting device which has the ability to produce a cutting action at a distance remotely positioned from the operator of the device.

A manually operated cutting cable including a pair of handles and a plurality of spaced apart, cylindrical cutting elements disposed along a portion thereof is presently manufactured by Green Mountain Plant Products of Norwalk, Connecticut (see page 42 of the April 1978 issue of Popular Mechanics).

U.S. Pat. Nos. 325,364 (Shipe), 2,855,724 (Graves), 3,090,159 (Wimeerly), 3,747,652 (Meadows), and 323,602 (Shipe) disclose manually operating cutting devices fabricated from a plurality of chain links which include a plurality of cutting teeth on a single side of the chain. The chain disclosed in the above-recited patents is deflectable in a single plane and is similar in fabrication to a bicycle chain.

U.S. Pat. No. 3,958,332 (Dates) discloses a power driven saw which causes a cable having a plurality of cutting elements to rotate in a single direction in order to provide a cutting action.

U.S. Pat. Nos. 1,175,302 (Sallee), 789,512 (Waller), and 1,520,422 (Lind) disclose chain saw cutting devices having a generally U-shaped frame for supporting the cutting chain and for rotating the cutting chain in a single direction to provice cutting action.

SUMMARY OF THE INVENTION

The present invention contemplates a cutting device comprising a flexible cutting element having cutting teeth disposed at intervals in a complete circle for a predetermined length around the periphery thereof. A first handle is coupled to one end of the cutting element while a second handle is coupled to the other end of the cutting element. The first and second handles enable an operator to impart an oscillatory motion to the cutting element to cut a material remotely located from the operator.

A power driven cutting apparatus comprises a flexible cutting element having cutting teeth disposed at intervals in a complete circle around the periphery thereof along a predetermined length. A frame is coupled to the cutting element for receiving and guiding the cutting element. Means coupled to the cutting element and to the frame imparts an oscillatory motion to the cutting element to enable the oscillating teeth of the cutting element to cut a selected material.

An important aspect of the present invention is the ability of the flexible cutting element to cut properly even though it is twisted as it oscillates back and forth with respect to a material.

Another important aspect of the present invention is its ability to cut a material without causing the flexible cutting element to pass through the drive system to the cutting element.

DESCRIPTION OF THE DRAWINGS

The invention is pointed out with particularity in the appended claims. However, other objects and advantages together with the operation of the invention may be better understood by reference to the following detailed description taken in connection with the following illustrations wherein:

FIG. 3 is a sectional view from above of the power driven cutting device of the present invention.

FIG. 4 is a sectional view of the cutting device illustrated in FIG. 3, taken along section line 4—4.

FIG. 7 illustrates the various cutting configurations of the present invention.

FIGS. 8 and 9 illustrate various uses of the present invention.

FIGS. 11A–E illustrate an additional configuration of the cutting element of the present invention and a method for fabricating said element.

FIG. 12 illustrates a heavy duty cutting racket version of the present invention which is powered by a vehicle.

DESCRIPTION OF THE PREFERRED EMBODIMENT

In order to better illustrate the advantages of the invention and its contributions to the art, a preferred hardware embodiment of the invention will now be described in some detail.

Figure 1:
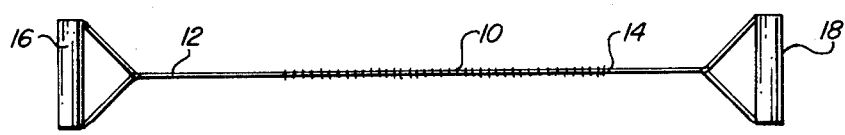
FIG. 1 illustrates a hand powered version of the present invention.

Referring now to FIG. 1, a cutting device of the present invention includes a flexible cutting element 10, first and second extension cables 12 and 14 and first and second handles 16 and 18. For close in work extension cables 12 and 14 would not be required and handles 16 and 18 would be directly coupled to the ends of cutting element 10.

Referring now to FIG. 2, various embodiments of cutting element 10 are illustrated. FIG. 2A illustrates a cutting element fabricated from a plurality of chain links 20 which are linked together to form a continuous chain. Each link is formed in a figure eight configuration and includes a plurality of cutting teeth, such as tooth 22. These cutting teeth are formed in each link during the manufacturing process while the chain link is still red hot. The cutting teeth are partially severed and lifted from the surface of each chain link at a plurality of locations along its entire length. Each chain link thus formed includes cutting teeth which are disposed at intervals in a complete circle around the body of each link.

Figure 2C:
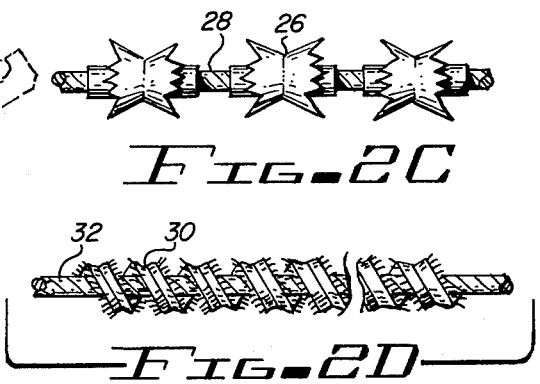
FIGS. 2A–D illustrate various configuratons of the cutting element of the present invention.
Figure 2D:
Figure 2A:
Figure 2B:
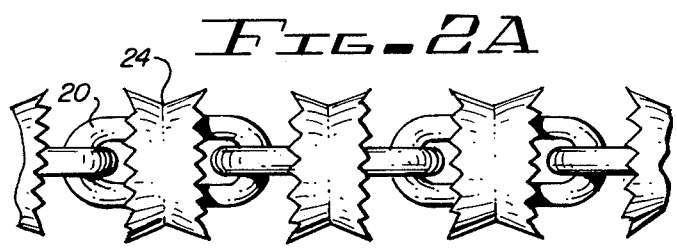

FIG. 2B illustrates a cutting element formed from a plurality of oval chain links. Each link of the chain includes a separate cutting unit 24 which incorporates a plurality of cutting teeth disposed in a full circle around each end thereof. Each cutting unit 24 can either be formed in a circular or an oval configuration and is rigidly attached to each link of the cutting element.

FIG. 2C illustrates a cutting element fabricated from a plurality of cutting units 26 each of which is rigidly coupled at a point to a flexible cable 28. Each cutting unit 26 is fabricated as a single unit and includes two groupings of teeth each of which extends in a full circle around each end of each cutting unit.

FIG. 2D illustrates another embodiment of a cutting element of the present invention. Flexible band 30 includes a first and a second plurality of teeth extending from each side thereof. This toothed band is wrapped around a predetermined length of flexible cable 32 to form the cutting element of the present invention. The teeth of flexible band 30 extend in a full circle around the periphery of cable 32. The teeth protruding from one side of flexible band 30 generate a cutting action when cable 32 is displaced in a first direction while the teeth on the opposite side of flexible band 30 generate a cutting action when cable 32 is displaced in a second direction opposite from the first direction.

Referring now to FIG. 11, FIGS. 11A and B indicate the manner in which a plurality of conventional oval-shaped chain links, such as link 98, are crimped inwardly to form a chain of dog-bone-shaped links. FIG. 11C indicates that a flat plate 100 includes a plurality of teeth which are punched upward from the main body of the plate.

FIGS. 11D and E indicate that plate 100 is formed into a tubular configuration around each chain link 98. As is indicated in FIG. 11E, each adjacent tubular element includes a plurality of teeth 102 which are oriented in opposite opposing directions. In this manner, an additional configuration of the cutting element can be readily and inexpensively manufactured.

Referring now to FIGS. 3 and 4, a powered version of the present invention is disclosed. A frame 34 includes a base 36 and first and second arms 38 and 40. Cutting element 10 is positioned between the ends of arms 38 and 40 and is coupled to cables 42 and 44 by fasteners 46 and 48. Pulleys 50, 52, 54 and 46 are positioned around the periphery of frame 34 to rotatably couple cables 42 and 44 to frame 34.

Oscillator means 58 is coupled to the ends of cables 42 and 44 and displaces these two cables back and forth with an amplitude of from about six to twelve inches. The length of cutting element 10 and the relative positioning of fasteners 46 and 48 is coordinated so that when oscillator means 58 displaces cutting element 10 fully in either direction, fasteners 46 and 48 will not come in contact with pulleys 50 and 56. A protective guard 60 may be installed between arms 38 and 40 when the present invention is utilized for hedge trimming or grass cutting purposes. For use in wood cutting and other related applications, protective guard 60 will be detached from the unit.

Figure 6:
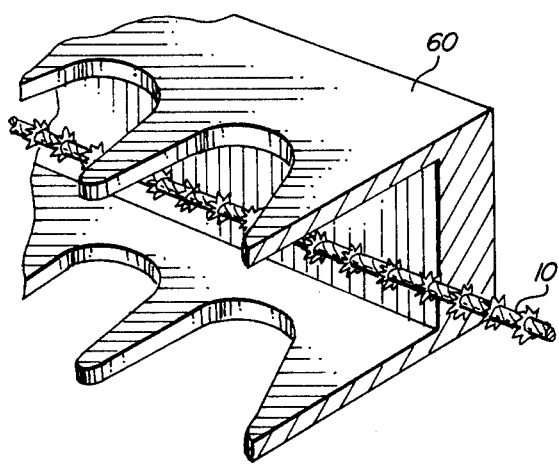
FIG. 6 is a view of the protective guard for the present invention.
Figure 5:
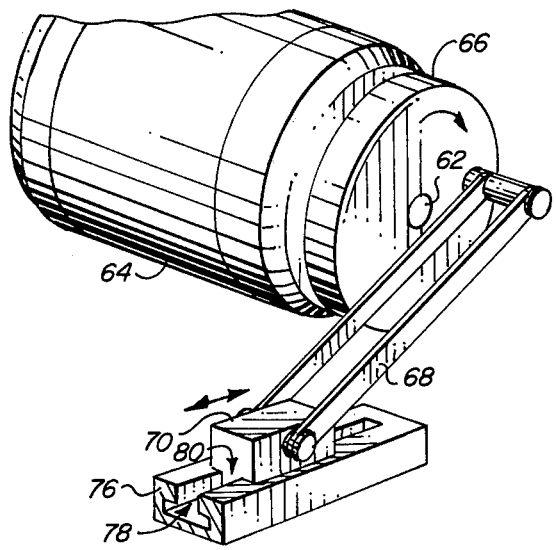
FIG. 5 is an enlarged partial view of the drive elements of the present invention.

Referring now to FIGS. 3, 4 and 5, the various elements of oscillator means 58 will be described. The shaft 62 of rotating means 64 is coupled to a drive wheel 66. Rotation of shaft 62 causes drive wheel 66 to rotate. Rotating means 64 can be an electric motor, an internal combustion engine, or some other power source capable of producing rotary motion.

A pair of drive arms 68 are rotatably coupled to the periphery of drive wheel 66 and to the outer surfaces of a drive block 70. Cables 42 and 44 are coupled to the ends of drive block 70 at points 72 and 74. A guide means is formed by a guide block 76 which includes a female notch 78 in which a male notch 80 of drive block 70 slides.

Rotation of shaft 62 of rotating means 64 causes drive wheel 66 to rotate. The rotation of drive wheel 66 causes a displacement of drive arms 68 and creates a back and forth reciprocating motion of drive block 70 with respect to guide block 76. The back and forth reciprocations of drive block 70 displace cables 42 and 44 and thus causes cutting element 10 to oscillate back and forth. The operating RPM of rotating means 64 is controlled so that cutting element 10 oscillates at a speed of between 500 to 2000 oscillations per minute.

FIG. 9 illustrates that for a grass cutting operation a plurality of wheels, such as wheel 82, are rotatably coupled to arms 38 and 40 of frame 34. This permits the cutting device of the present invention to be readily rolled over the surface of the ground while maintaining cutting element 10 at a predetermined fixed distance from the surface of the ground. FIG. 9 further illustrates how a handle 84 can be coupled to the present invention to facilitate grass cutting and hedge clipping operations.

Referring now to FIG. 7, cutting operations of various types are illustrated. The present invention can be utilized as is indicated by reference number 86 to cut tree trunks. As a result of the rapid oscillation rates of cutting element 10 with respect to the stationary material being cut, the frame of the present invention is prevented from oscillating during the cutting procedure. Reference numbers 88 and 90 indicate that extension cables 12 and 14 can be coupled between cutting element 10 and arms 38 and 40 to permit the operator to stand at a remote position with respect to the material being cut. Reference number 92 indicates that a handle 84 can be elevated to cut tree limbs which are located at intermediate distances from the ground.

Reference numbers 94 and 96 indicate apertures in the ends of arms 38 and 40 through which the cutting cable will be routed when the extension cable illustrated in FIG. 7 is coupled to the present invention.

Figure 10:
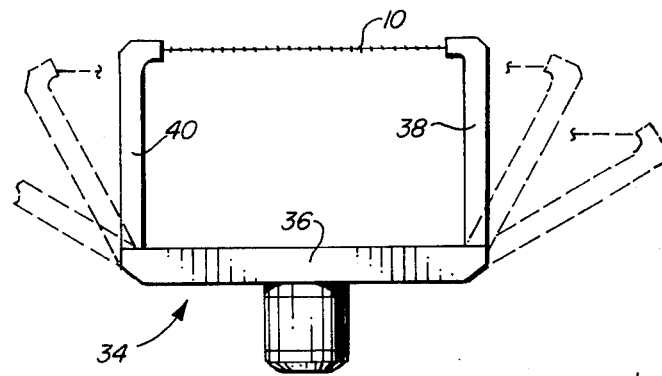
FIG. 10 illustrates an embodiment of the present invention which includes a frame having pivoted arms for accommodating cutting elements of various lengths.

Referring now to FIG. 10 a frame 34 for the present invention is disclosed which includes pivotal couplings positioned between base 36 and arms 38 and 40. These two pivotal couplings permit arms 38 and 40 to be positioned at various angles with respect to base 36 to accommodate cutting elements of various different lengths.

Referring now to FIG. 12, a heavy duty version of the cutting racket of the present invention (designated by reference numeral 104) can be coupled to and driven by a vehicle 106. In this version of the present invention, one or a plurality of extension cables can be coupled to and driven by the heavy duty cutting racket 104 to facilitate the cutting of trees or other objects which are positioned partially underwater or at locations which are relatively inaccessable to the source of power provided by vehicle 106. The length of the extension cables utilized in connection with heavy duty cutting racket 104 and vehicle 106 will be determined by the distance between the vehicle and the item to be cut.

As will be readily appreciated, one of the primary safety features of the present invention is the ability to position the cutting element at a safe distance from a human operator. This highly significant safety feature is not presently available in any motor driven cutting systems of a type similar to the present invention.

It will be apparent to those skilled in the art that the disclosed cutting device may be modified in numerous ways and may assume many embodiments other than the preferred forms specifically set out and described above. Accordingly, it is intended by the appended claims to cover all such modifications of the invention which fall within the true spirit and scope of the invention.

We claim:

1. A cutting apparatus comprising:
   (a) a flexible cutting element having first and second ends and cutting teeth disposed at intervals in a complete circle around the periphery thereof along a predetermined length;
   (b) a frame coupled to said cutting element for receiving and guiding said cutting element including
      i. a base
      ii. a first arm having first and second ends, said first end being coupled to said base; and
      iii. a second arm having first and second ends, said first end being coupled to said base; and
   c. means coupled to said cutting element and to said base for imparting an oscillatory motion to said cutting element to enable the oscillating teeth of said cutting element to cut a selected material.

2. The apparatus of claim 1 wherein said oscillating means includes:
   (a) a shaft;
   (b) means coupled to said shaft for rotating said shaft; and
   (c) means coupled to said shaft and to said cutting element for converting the rotary motion of said shaft into oscillatory motion of said cutting element.

3. The apparatus of claim 2 wherein said converting means includes:
   (a) a drive wheel coupled at the center thereof to said shaft; and
   (b) means coupled to the first and second ends of said cutting element and to a point on the periphery of said drive wheel for converting the rotary motion of said drive wheel into oscillatory motion of said cutting element.

4. The apparatus of claim 3 wherein said drive wheel converting means includes:
   (a) a drive block coupled to the first and second ends of said cutting element;
   (b) a drive arm having one end rotatably coupled to a point on the periphery of said drive wheel and another end rotatably coupled to a point on said drive block; and
   (c) guide means coupled to said frame and to said drive block for causing said drive block to be displaced back and forth along a line as said drive wheel rotates to impart an oscillatory motion to said cutting element.

5. The apparatus of claim 4 wherein said guide means includes:
   (a) a guide block coupled to said frame and to said drive block and including a female notch in the surface of said guide block adjacent said drive block; and
   (b) a male notch formed in the surface of said drive block adjacent said guide block for guiding said drive block within the female notch in said guide block.

6. The apparatus of claim 5 further including first and second parallel oriented drive arms coupled at first and second points to said drive block.

7. The apparatus of claim 1 wherein said base and the first ends of said first and second arms are coupled to form a U-shaped frame.

8. The apparatus of claim 1 further including a protective guard having one end coupled to the second end of said first arm and another end coupled to the second end of said second arm.

9. The apparatus of claim 8 wherein said guard includes a plurality of serrated edges.

10. The apparatus of claim 1 further including means for pivotally coupling said first and second arms to said base.

11. The apparatus of claim 1 further including:
    (a) a first wheel coupled to said first arm; and
    (b) a second wheel coupled to said second arm, said first and second wheels permitting said apparatus to be rolled upon the ground.

12. The apparatus of claim 11 further including:
    (a) a third wheel coupled to said first arm; and
    (b) a fourth wheel coupled to said second arm.

13. The apparatus of claim 12 further including a handle coupled to said frame for permitting an operator to propel said apparatus over the ground.

14. The apparatus of claim 2 wherein said rotating means rotates said shaft at a speed of at least 500 RPM.

15. The apparatus of claim 1 wherein said cutting element is suspended between the second ends of said first and second arms.

16. A cutting apparatus comprising:
    (a) a flexible cutting element having first and second ends and cutting teeth disposed at intervals in a complete circle around the periphery thereof along a predetermined length thereof;
    (b) a frame coupled to said cutting element for receiving and guiding said cutting element;
    (c) means coupled to said cutting element and to said frame for imparting an oscillatory motion to said cutting element to enable the oscillating teeth of said cutting element to cut a selected material, said oscillating means including
       i. a shaft;
       ii. means coupled to said shaft for rotating said shaft;
       iii. a drive wheel coupled at the center thereof to said shaft;
       iv. a drive block coupled to the first and second ends of said cutting element;
       v. a drive arm having one end rotatably coupled to said drive wheel and another end rotatably coupled to said drive block; and
       vi. guide means coupled to said frame and to said drive block for causing said drive block to be displaced back and forth along a line as said drive wheel rotates to impart an oscillatory motion to said cutting element.

17. The apparatus of claim 16 wherein said guide means includes:
    (a) a guide block coupled to said frame and to said drive block and including a female notch in said guide block adjacent said drive block; and
    (b) a male notch extending from said drive block adjacent said guide block for guiding said drive block within the female notch in said guide block.

18. The apparatus of claim 17 wherein said frame includes:
    (a) a base coupled to said oscillating means;
    (b) first arm having first and second ends, said first ends being coupled to said base; and (c) a second arm having first and second ends, said first end being coupled to said base.

19. The apparatus of claim 17 wherein the second ends of said first and second arms are separated by a predetermined spacing.

20. The apparatus of claim 11 wherein the cutting teeth of said cutting element oscillate back and forth between the second ends of said first and second arms.

21. The apparatus of claim 20 wherein said frame further includes means for pivotally coupling said first and second arms to said frame.

22. The apparatus of claim 19 further including a protective guard coupled to the second ends of said first and second arms.

23. The apparatus of claim 22 wherein said protective guard further includes serrated edges.

24. The apparatus of claim 20 wherein said cutting element is fabricated from a plurality of chain links having teeth extending in a complete circle from each of said links.

25. The apparatus of claim 24 wherein each of said plurality of chain links is fabricated in an oval configuration.

26. The apparatus of claim 25 wherein a single cutting unit is rigidly attached to each of said links.

27. The apparatus of claim 26 wherein each of said oval chain links includes a single circular cutting unit rigidly attached about the periphery thereof.

28. The apparatus of claim 26 wherein each of said cutting units includes:
(a) first and second ends;
(b) a first plurality of cutting teeth extending in a first direction from said first end; and
(c) a second plurality of cutting teeth extending in a second direction from said second end to permit said cutting device to cut during oscillation in both a first and a second direction.

* * * * *